(12) United States Patent
Crist et al.

(10) Patent No.: US 11,837,896 B2
(45) Date of Patent: Dec. 5, 2023

(54) WIRELESS LIGHTING CONTROLLER WIRELESS CHARGING

(71) Applicant: ABL IP Holding LLC, Atlanta, GA (US)

(72) Inventors: Michael A. Crist, Atlanta, GA (US); Samar Shaker Soliman, Marietta, GA (US); John Richard Johnson, Flowery Branch, GA (US); Richard Lee Westrick, Jr., Social Circle, GA (US)

(73) Assignee: ABL IP Holding LLC, Atlanta, GA (US)

( * ) Notice: Subject to any disclaimer, the term of this patent is extended or adjusted under 35 U.S.C. 154(b) by 239 days.

(21) Appl. No.: 17/374,421

(22) Filed: Jul. 13, 2021

(65) Prior Publication Data

US 2023/0015680 A1    Jan. 19, 2023

(51) Int. Cl.
*H01M 10/46* (2006.01)
*H02J 7/00* (2006.01)
*H02J 50/10* (2016.01)
*H02J 7/02* (2016.01)

(52) U.S. Cl.
CPC ........ *H02J 7/0044* (2013.01); *H02J 7/00032* (2020.01); *H02J 7/02* (2013.01); *H02J 50/10* (2016.02)

(58) Field of Classification Search
CPC .......... H02J 7/02; H02J 7/0044; H02J 7/0042; H02J 7/00032; H02J 50/10; H02J 50/005
USPC ................................. 320/107, 108, 114, 115
See application file for complete search history.

(56) References Cited

U.S. PATENT DOCUMENTS

| | | | |
|---|---|---|---|
| 9,368,025 B2 | 6/2016 | Carmen, Jr. | |
| 9,812,890 B1 | 11/2017 | Leabman et al. | |
| 9,935,440 B1* | 4/2018 | Szeto | H01R 13/6205 |
| 10,804,746 B2 | 10/2020 | Lee et al. | |
| 2013/0335020 A1* | 12/2013 | Moore | H02J 7/0042 320/109 |
| 2018/0227017 A1 | 8/2018 | Lee et al. | |
| 2019/0237986 A1* | 8/2019 | Agarwal | H02J 7/0044 |
| 2019/0312453 A1* | 10/2019 | Rohmer | H02J 7/0044 |

FOREIGN PATENT DOCUMENTS

| | | | |
|---|---|---|---|
| CN | 104620471 | 1/2018 | |
| JP | 2015100268 | 5/2015 | |
| WO | WO-2021150292 A1 * | 7/2021 | H01F 7/20 |

* cited by examiner

*Primary Examiner* — Edward Tso
(74) *Attorney, Agent, or Firm* — Kilpatrick Townsend & Stockton LLP (57) ABSTRACT

A wall-mounted wireless battery charger for a wireless remote lighting controller includes: a wall plate configured to removably retain the wireless remote lighting controller; and an inductive charging transmitter circuit coupled to the wall plate, the inductive charging transmitter circuit being configured to wirelessly interface with an inductive charging receiver circuit of the wireless remote lighting controller when the wireless remote lighting controller is retained by the wall plate. The inductive charging receiver circuit is configured to wirelessly receive power from the inductive charging transmitter circuit and generate a direct current (DC) voltage to charge a battery of the wireless remote lighting controller.

17 Claims, 12 Drawing Sheets

WIRELESS LIGHTING CONTROLLER WIRELESS CHARGING

BACKGROUND

Unless otherwise indicated herein, the materials described in this section are not prior art to the claims in this application and are not admitted to be prior art by inclusion in this section.

Wireless remote lighting controllers provide convenient handheld control of various functions (e.g., on/off, dimming, etc.) of lighting fixtures in a particular space, for example, a conference room, a building lobby, etc. Wireless remote lighting controllers communicate control signals to lighting fixtures through radio waves instead of through low-voltage hardwiring. Conventional wireless remote lighting controllers are powered either by non-rechargeable batteries that require periodic replacement or by rechargeable batteries that requires a wired charging interface. The wired charging interface can include charging contacts on a charging base and corresponding charging contacts on the wireless remote lighting controller. Inclusion of charging contacts on the charging base and wireless remote lighting controller is an added expense in producing the products. In addition, as the contacts become dirty or oxidized charging effectiveness is reduced.

SUMMARY

Systems for wirelessly charging wireless remote lighting controllers are provided.

According to various aspects there is provided a wall-mounted wireless battery charger for a wireless remote lighting controller. In some aspects, the wall-mounted wireless battery charger may include: a wall plate configured to removably retain the wireless remote lighting controller; and an inductive charging transmitter circuit coupled to the wall plate, the inductive charging transmitter circuit be configured to wirelessly interface with an inductive charging receiver circuit of the wireless remote lighting controller when the wireless remote lighting controller is retained by the wall plate. The inductive charging receiver circuit may be configured to wirelessly receive power from the inductive charging transmitter circuit and generate a direct current (DC) voltage to charge a battery of the wireless remote lighting controller.

According to various aspects there is provided a wall plate. In some aspects, the wall plate may include: a mounting mechanism configured to removably retain a wireless remote lighting controller; and an inductive charging transmitter circuit configured to wirelessly interface with an inductive charging receiver circuit of the wireless remote lighting controller when the wireless remote lighting controller is retained by the mounting mechanism. The inductive charging receiver circuit may be configured to wirelessly receive power from the inductive charging transmitter circuit and generate a direct current (DC) voltage to charge a battery of the wireless remote lighting controller.

According to various aspects there is provided a desktop cradle for inductively charging a wireless remote lighting controller. In some aspects, the desktop cradle may include: a mounting mechanism configured to removably retain the wireless remote lighting controller; and an inductive charging transmitter circuit configured to wirelessly interface with an inductive charging receiver circuit of the wireless remote lighting controller when the wireless remote lighting controller is retained by the mounting mechanism. The inductive charging receiver circuit may be configured to wirelessly receive power from the inductive charging transmitter circuit and generate a direct current (DC) voltage to charge a battery of the wireless remote lighting controller.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Wireless remote lighting controllers provide convenient handheld control of various functions such as on/off, dimming, color settings, activation of preset lighting scenes (e.g., light levels in different preset zones), etc., of lighting fixtures in a particular space, for example, a conference room, a building lobby, etc. Lighting fixtures may also be referred to herein as luminaires. Conventional wireless remote lighting controllers are powered either by non-rechargeable batteries that require periodic replacement or by rechargeable batteries that require periodic recharging using a wired charging interface including charging contacts on a charging base and corresponding charging contacts on the wireless remote lighting controller.

Charging contacts on the charging base and wireless remote lighting controller add cost to the products. Also, as the charging contacts become dirty or oxidized charging effectiveness is reduced and the batteries of the wireless remote lighting controller may take longer to charge.

Aspects of the present disclosure may provide systems for inductively charging a wireless remote lighting controller. A user may charge the wireless remote lighting controller by simply placing the wireless remote lighting controller onto a wireless charging station without requiring any wired connections between the wireless remote lighting controller and the wireless charging station. The wireless charging station for the wireless remote lighting controller can be incorporated into a mounting structure for the wireless remote lighting controller and may take various forms, for example, but not limited to, table or desk mounting structures, wall mounting structures, etc. Alternatively, the wireless charging station for the wireless remote lighting controller may be a generic wireless charger. The wireless charging station for the wireless remote lighting controller eliminates the need for frequent battery replacement by replacing non-rechargeable batteries with rechargeable batteries and also eliminates the need for a wired charging connection for the wireless remote lighting controller thereby improving ease of use and user satisfaction.

According to some aspects of the present disclosure, the wireless remote lighting controller may be placed onto a wireless charging station that may include an inductive charging transmitter. The wireless charging station can be powered via a wired power connection, battery pack, or other power source. The wireless charging station may be incorporated into a mount for securing the wireless remote lighting controller. The mount for the wireless remote lighting controller may be table or desk mount, wall mount, etc. In some implementations, the wireless charging station may implement a wireless charging standard, for example, the Qi standard which operates in the 100-205 kHz frequency band, the Power Matter Alliance (PMA) standard which operates in the 277-357 kHz frequency band, etc. In some implementations, the a proprietary wireless charging protocol which operates in the 100-205 kHz frequency band, the 277-357 kHz frequency band, or another frequency band.

The wireless remote lighting controller may include an inductive charging receiver. The batteries of the wireless remote lighting controller may be recharged any time the wireless remote lighting controller is placed onto a wireless charging station. In some implementations, a short-range wireless data link, for example, a near field communication (NFC) link, a radio frequency identification (RFID) link, a Bluetooth or Bluetooth Low Energy (BLE) link, or other wireless data link, may be provided between the wireless remote lighting controller and the wireless charging station to communicate data such as charging status, firmware updates, device diagnostics/health data, etc. In some implementations, data may be transferred between the wireless remote lighting controller and wireless charging station via modulation of the charging signal.

Figure 1A:
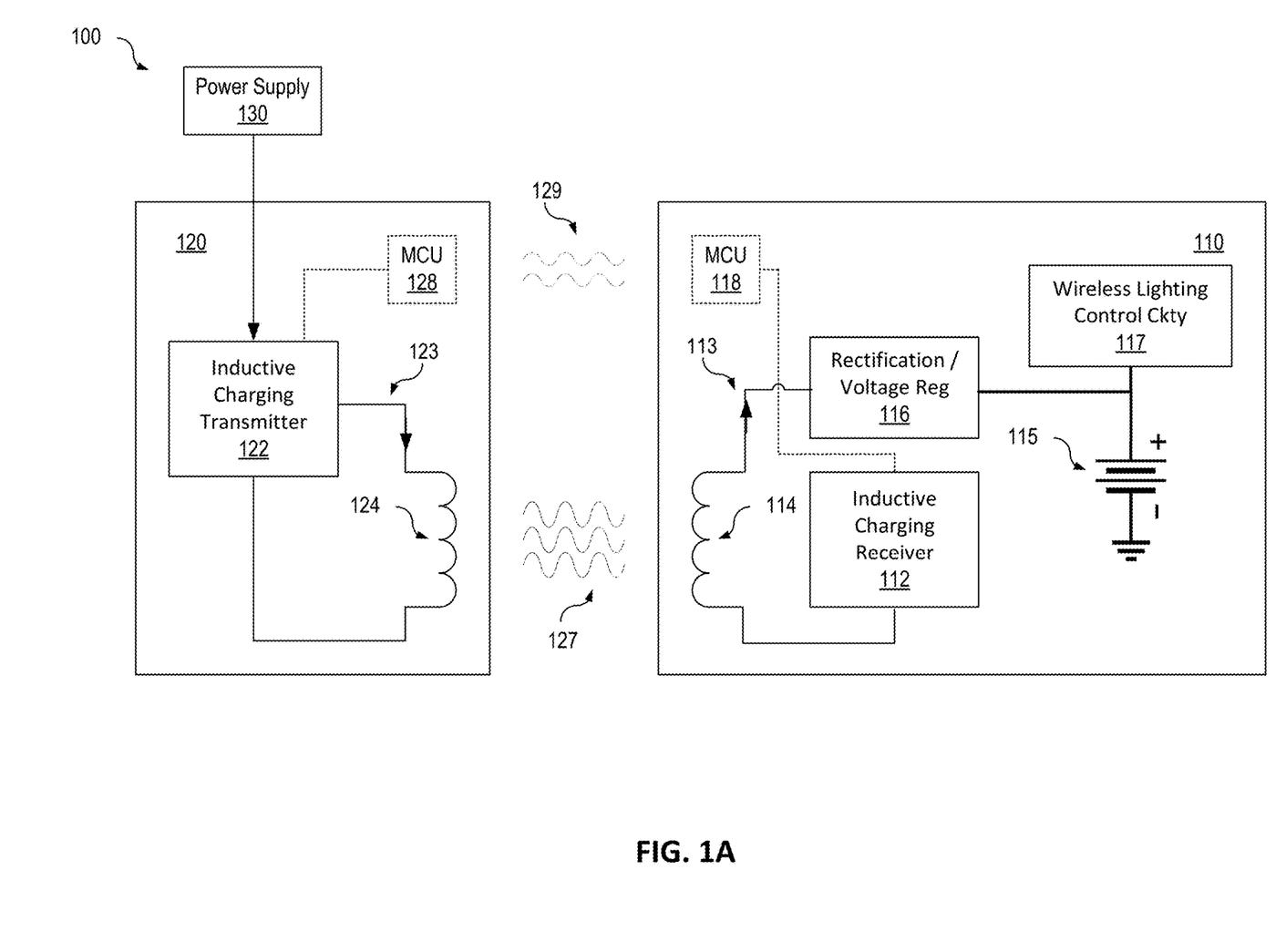
FIG. 1A is a block diagram illustrating an example of an inductive charging circuit for a wireless remote lighting controller according to some aspects of the present disclosure.

FIG. 1A is a block diagram illustrating an example of an inductive charging circuit 100 for a wireless remote lighting controller according to some aspects of the present disclosure. Referring to FIG. 1A, a wireless remote lighting controller 110 may be wirelessly charged by a wireless charging station 120. The wireless charging station 120 may be powered by a wired connection to an external power supply 130. The external power supply 130 may be a wired power connection to an alternating current (AC) source, a battery pack, universal serial bus (USB) power source, or other power source. In some implementations, the wireless charging station 120 may be powered by a power supply, for example, a battery or battery pack, incorporated into the wireless charging station 120.

The wireless charging station 120 that may include an inductive charging transmitter circuit 122. The inductive charging transmitter circuit 122 may generate a current 123 through a transmitting coil 124 (e.g., a magnetic loop antenna) to create a charging signal 127 (e.g., an oscillating magnetic field) across a short distance, for example, several centimeters, that can create an electrical current in a receiver antenna (e.g., the coil 114).

The wireless remote lighting controller 110 may include a receiver antenna, e.g., the receiving coil 114. The oscillating magnetic field of the charging signal 127 can induce an electrical current 113 in the receiving coil 114. The amount of current induced in the receiving coil 114 may be controlled by the inductive charging receiver circuit 112. The induced electrical current 113 may be rectified by the rectification/regulation circuit 116 to provide a regulated direct current (DC) voltage to the wireless lighting control circuitry 117 and to charge the battery 115. The wireless lighting control circuitry 117 may provide control and/or data signals to the luminaires in the lighting control network.

In some implementations, the wireless charging station 120 may include a microcontroller unit (MCU) 128 and the wireless remote lighting controller 110 may also include a microcontroller unit (MCU) 118. The MCU 128 in the wireless charging station 120 and the MCU 118 in the wireless remote lighting controller 110 may form a wireless data link between wireless charging station 120 and wireless remote lighting controller 110 to communicate data such as charge state, charge mode (fast/slow), device settings, firmware updates, network security keys, diagnostic data, etc.

The wireless remote lighting controller 110 may be in a low power state when not placed on the wireless charging station 120 and may not be able to wirelessly receive control or data signals from the wireless charging station 120. In the low power state, the wireless data link of the MCU 118 in the wireless remote lighting controller 110 may not be enabled and so may not be able to receive messages which are not part of a transaction initiated by the wireless remote lighting controller 110. In the low power state, the MCU 118 may monitor for button presses. Upon detecting a button press, the MCU 118 may wake up to cause the wireless lighting control circuitry 117 to transmit a command associated with the button which has been pressed. The MCU 118 may then stay in a higher power state (e.g., higher than the low power state) for a short reception period of time (e.g., seconds or fractions of a second) with its receiver enabled to verify that an acknowledgment message was received properly, for example, from a luminaire, and/or to receive a queued command stored on another device. Once the reception period has expired, the MCU 118 may return to the low power state.

Data may be transmitted between the wireless remote lighting controller 110 and the wireless charging station 120 during charging via the wireless data link formed by the MCU 128 in the wireless charging station 120 and the MCU 118 in wireless remote lighting controller 110. For example, a controller in a luminaire may perform diagnostic routines or otherwise detect problem conditions with the luminaire and may communicate diagnostic data to the wireless remote lighting controller 110. The diagnostic data may be cached by the wireless remote lighting controller 110 and may be downloaded to the wireless charging station 120 when the wireless remote lighting controller 110 is placed on the wireless charging station 120. Similarly, settings, for example, lighting control settings or firmware updates that may be cached on the wireless charging station 120 may be uploaded to controller when controller placed on charger.

Communication between the wireless charging station 120 and the wireless remote lighting controller 110 may be accomplished via RFID, NFC, BLE, or other RF solution designed for providing a short range communication link, or through the induced charging signal (e.g., the charging signal 127). Using short range communication technologies can provide secure communication between the wireless charging station 120 and the wireless remote lighting controller 110. The wireless charging station 120 and the wireless remote lighting controller 110 may be incorporated into a lighting control network.

Figure 1B:
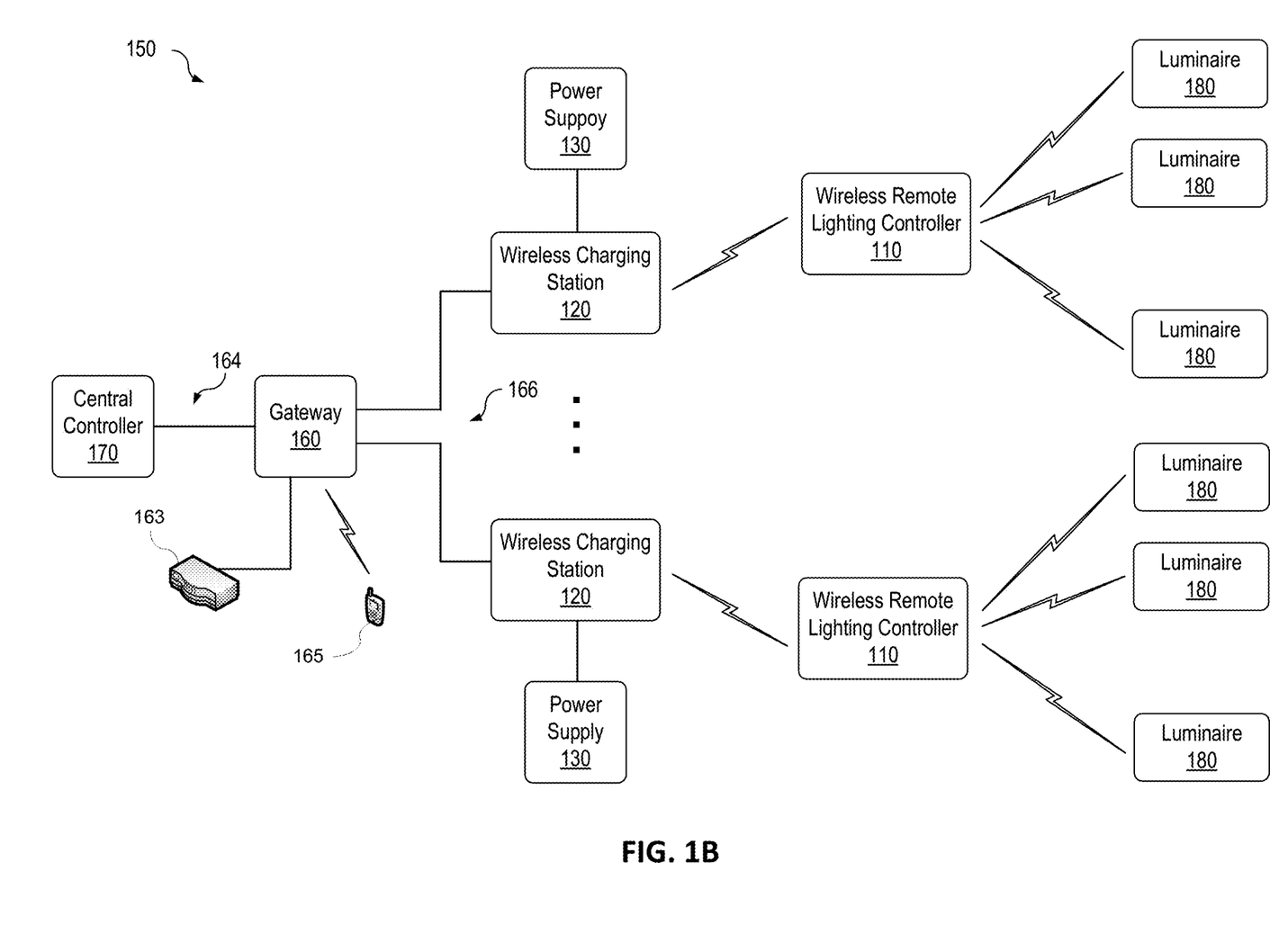
FIG. 1B is a block diagram illustrating an example of a lighting control network according to some aspects of the present disclosure.

FIG. 1B is a block diagram illustrating an example of a lighting control network 150 according to some aspects of the present disclosure. Referring to FIG. 1B, the lighting control network 150 may include one or more wireless charging stations 120, one or more wireless remote lighting controllers 110, one or more gateways 160, and a central controller 170. The central controller 170 may control overall operation of the lighting control network 150. The central controller 170 may be a microprocessor, microcomputer, computer, microcontroller, programmable controller, or other programmable device.

The gateway 160 may provide the network connections, wired or wireless or both, from the central controller 170 out to the wireless charging stations 120. Data and control signals communicated between the wireless charging stations 120 and the central controller 170 may be transmitted through the gateway 160. In some implementations, the gateway 160 may communicate with other devices such as edge devices 163 (e.g., routers, switches, computers, etc.), mobile devices 165 (e.g., smart phones, laptops, tablets, etc.), as well as other devices to receive data and control signals to be transmitted to the wireless remote lighting controllers 110. In some implementations, the gateway 160 may communicate with central controller 170 and/or other devices through the cloud. In some implementations, the central controller 170 and/or the gateway 160 may be omitted.

In some implementations, a mobile device (e.g., the mobile device 165) may provide a user interface for the wireless charging stations 120. For example, an application executing on the mobile device may enable settings to be input to a wireless charging station 120, and the settings may be uploaded to a wireless remote lighting controller 110 when the wireless remote lighting controller 110 is placed on the wireless charging station 120. Similarly, information such as diagnostic information or other information may be downloaded from the wireless remote lighting controller 110 when the wireless remote lighting controller 110 is placed on the wireless charging station 120 and displayed on the mobile device.

In some implementations, the mobile device may communicate with the wireless charging station 120 via a gateway (e.g., the gateway 160) or other device. In some implementations, the mobile device may directly communicate with the wireless charging station 120. Communication between the mobile device and the gateway 160 or the wireless charging station 120 may be accomplished using a communication method different that the communication method used for communication between the wireless charging station 120 and the wireless remote lighting controller 110. For example, communication may be effected using Wi-Fi or another wireless technology not used between the wireless charging station 120 and the wireless remote lighting controller 110.

In addition to providing wireless charging (e.g., inductive charging), the wireless charging stations 120 may wirelessly communicate data and control signals to the wireless remote lighting controllers 110. Each wireless remote lighting controller 110 may communicate with one or more luminaires 180. For example, the wireless remote lighting controller 110 may communicate with the luminaires 180 to control functions of the luminaires 180 such as turning the lighting elements of the luminaires on/off, dimming the lighting elements, changing the color of the lighting elements, activating preset lighting scenes in different preset zones, etc.

The communication link 164 between the gateway 160 and the central controller 170 may be a wired link or a wireless link. The communication link 166 between the wireless charging station 120 and the gateway 160 may be a wired link or a wireless link. In some implementations, the gateway may be incorporated into the wireless charging station 120. In such implementations, the wireless charging station 120 may include a transceiver (not shown) capable of transmitting and receiving over distances sufficient to communicate with the central controller 170.

Communication between the wireless charging station 120 and the gateway 160 and between the gateway 160 and the central controller 170 may be accomplished using a communication method different that the communication method used for communication between the wireless charging station 120 and the wireless remote lighting controller 110. For example, the central controller 170, the gateway 160, and the wireless charging station 120 may communicate using an Ethernet connection, a RS-485 connection, or wirelessly via Wi-Fi or another wireless technology not used between the wireless charging station 120 and the wireless remote lighting controller 110.

Figure 2A:
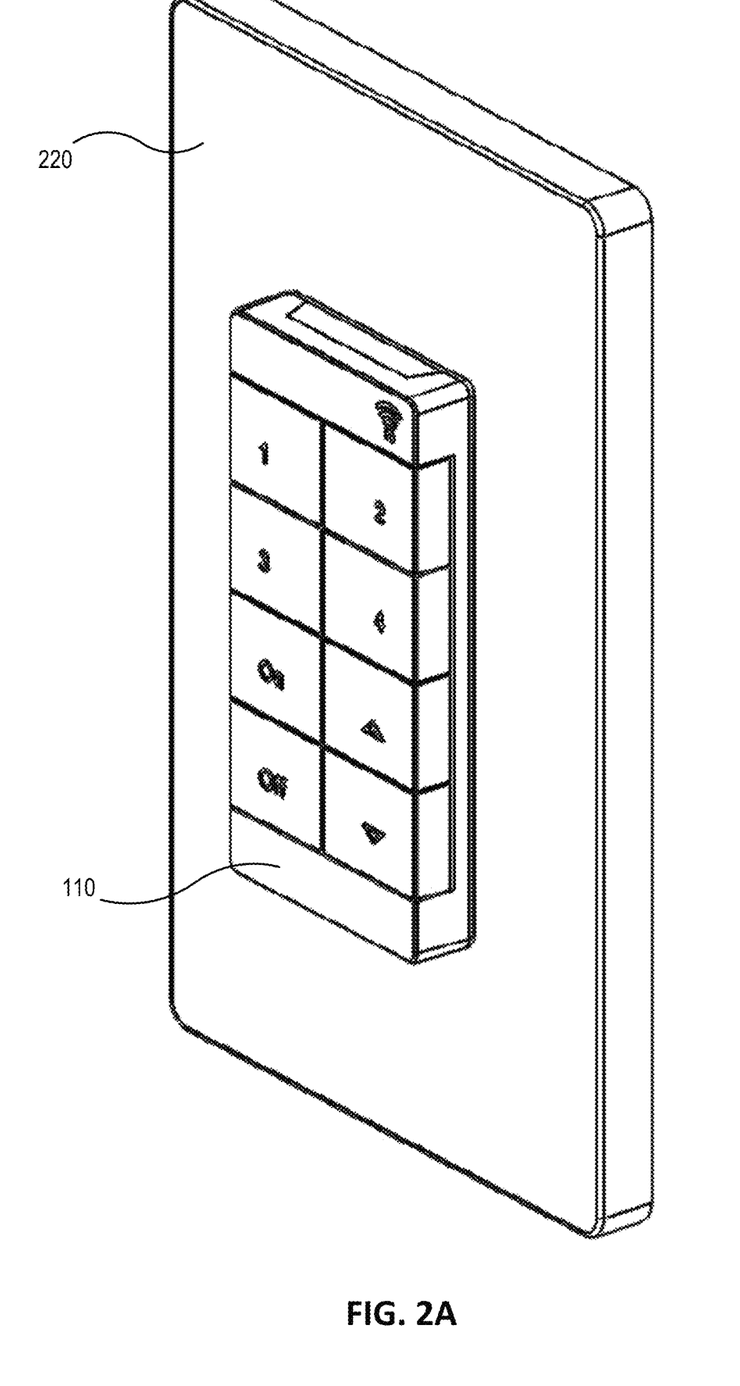
FIG. 2A is a diagram illustrating an example of a wall plate for inductively charging a wireless remote lighting controller according to some aspects of the present disclosure.

According to some aspects of the present disclosure, the wireless charging station 120 may be a wall-mounted wireless charging station. FIG. 2A is a diagram illustrating an example of a wall plate 220 for inductively charging a wireless remote lighting controller according to some aspects of the present disclosure. FIG. 2A illustrates a wireless remote lighting controller 110 mounted on the wall plate 220. The wireless charging station 120 may be attached to an opposite side of the wall plate 220 from the side on which the wireless remote lighting controller 110 mounted, or the wireless charging station 120 may be incorporated into a housing that encloses other components, for example, but not limited to, power regulation components, communication components, etc., of the wall plate 220. Power for the wireless charging station 120 may be provided by a wired connection to an external power supply (e.g., the external power supply 130) such as USB power, 120 VAC, power, etc.

Figure 2B:
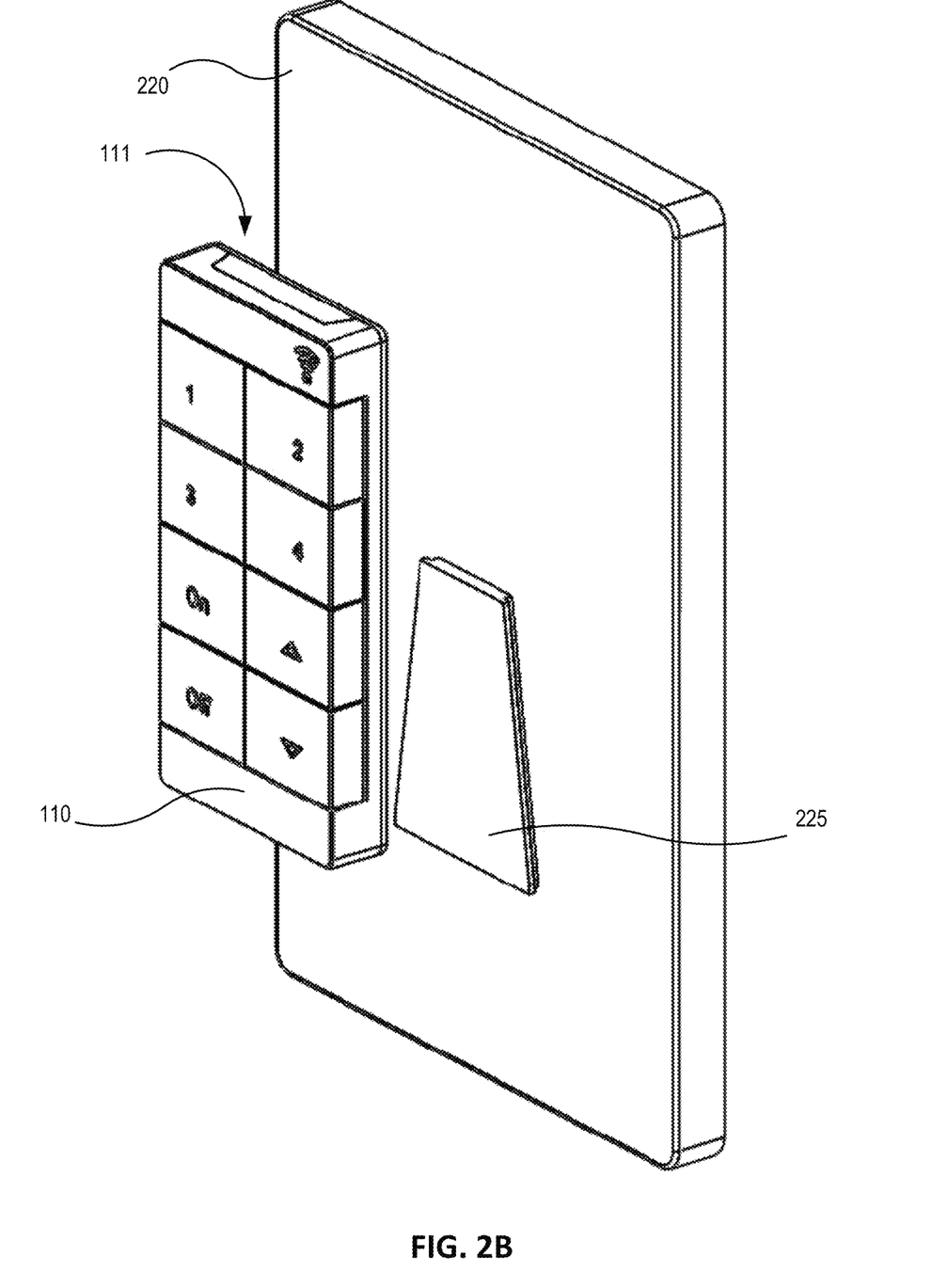
FIG. 2B is a diagram illustrating an example of a mounting mechanism on the wall plate of FIG. 2A according to some aspects of the present disclosure.

Inductive charging of the batteries in the wireless remote lighting controller 110 may occur when the wireless remote lighting controller 110 is mounted on the wall plate 220. The inductive charging may be performed without requiring an electrical connector or other resistance contact between the wireless remote lighting controller 110 and the wall plate 220. The wall plate 220 may include a mounting mechanism configured to retain the wireless remote lighting controller 110 when the wireless remote lighting controller 110 is placed on the wall plate 220. FIG. 2B is a diagram illustrating an example of a mounting mechanism on the wall plate of FIG. 2A according to some aspects of the present disclosure.

Figure 2C:
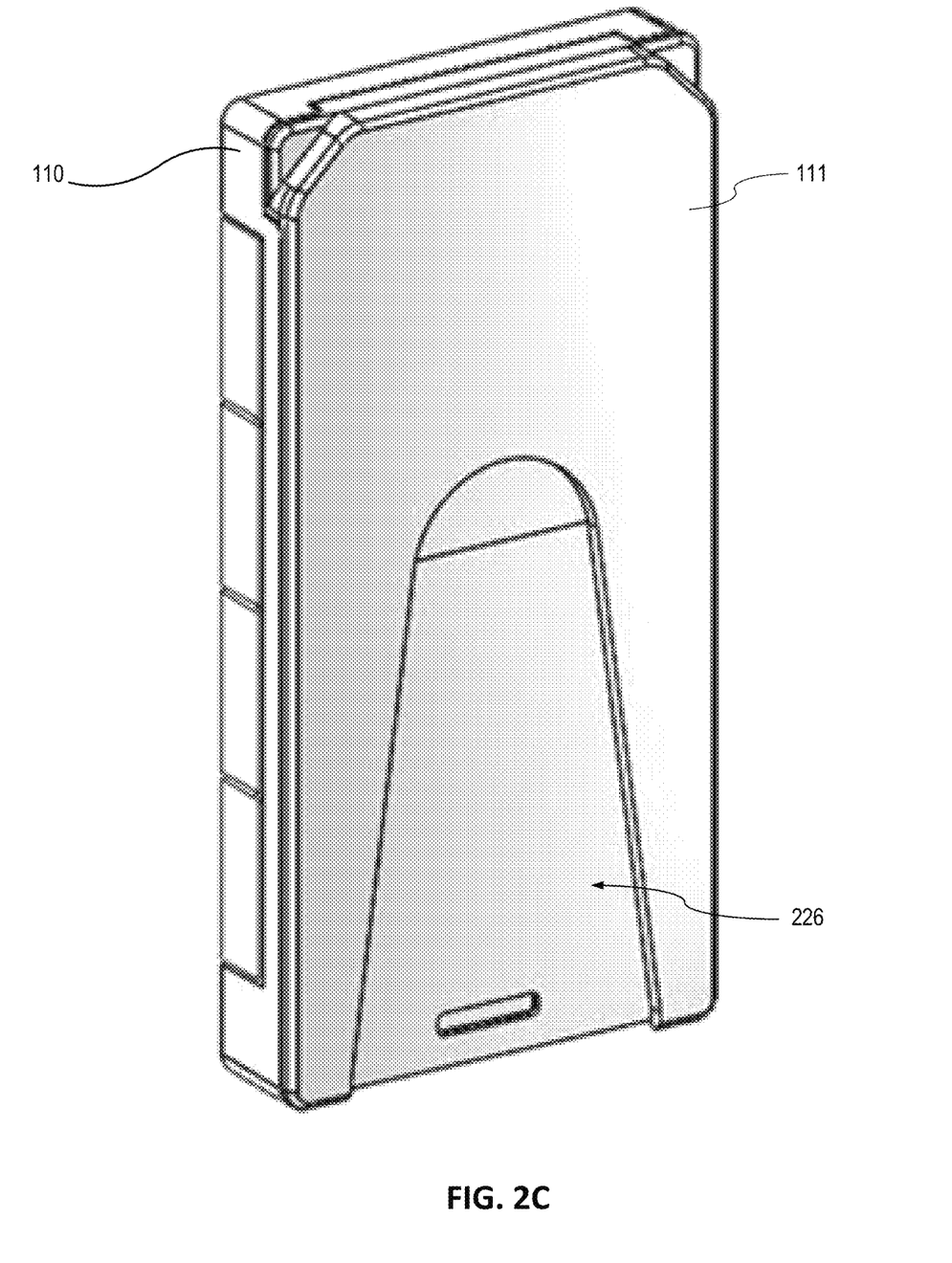
FIG. 2C is a diagram illustrating an example of a wireless remote lighting controller having a trapezoidal slot on the back surface corresponding to the trapezoidal mounting mechanism on the wall plate of FIG. 2B according to some aspects of the present disclosure.

As shown in FIG. 2B, the wall plate 220 may include a mounting mechanism 225. The mounting mechanism 225 may have a shape configured to retain the wireless remote lighting controller 110 when the wireless remote lighting controller 110 is mounted on the wall plate 220. For example, the mounting mechanism 225 may have a raised trapezoidal shape corresponding to a trapezoidal slot in the back surface 111 of the wireless remote lighting controller 110. FIG. 2C is a diagram illustrating an example of a wireless remote lighting controller 110 having a trapezoidal slot 226 on the back surface 111 corresponding to the trapezoidal mounting mechanism 225 on the wall plate 220 of FIG. 2B according to some aspects of the present disclosure. Other configurations of the mounting mechanism and corresponding configurations of the back surface of the wireless remote lighting controller may be used without departing from the scope of the present disclosure.

The mounting mechanism 225 may position the inductive charging receiver circuit (e.g., the inductive charging receiver circuit 112) of the wireless remote lighting controller 110 in proximity to the inductive charging transmitter circuit (e.g., the inductive charging transmitter circuit 122) of the wireless charging station (e.g., the wireless charging station 120) when the wireless remote lighting controller 110 is mounted on the wall plate 220. For example, the inductive charging transmitter circuit may be disposed in the approximate center of the wall plate 220 in an area that sits substantially flush against a back surface 111 of the wireless remote lighting controller 110. In some implementations, the wireless charging station 120 may be incorporated into a housing that encloses other components, for example, but not limited to, power regulation components, communication components, etc., of the wall plate 220.

Figure 2D:
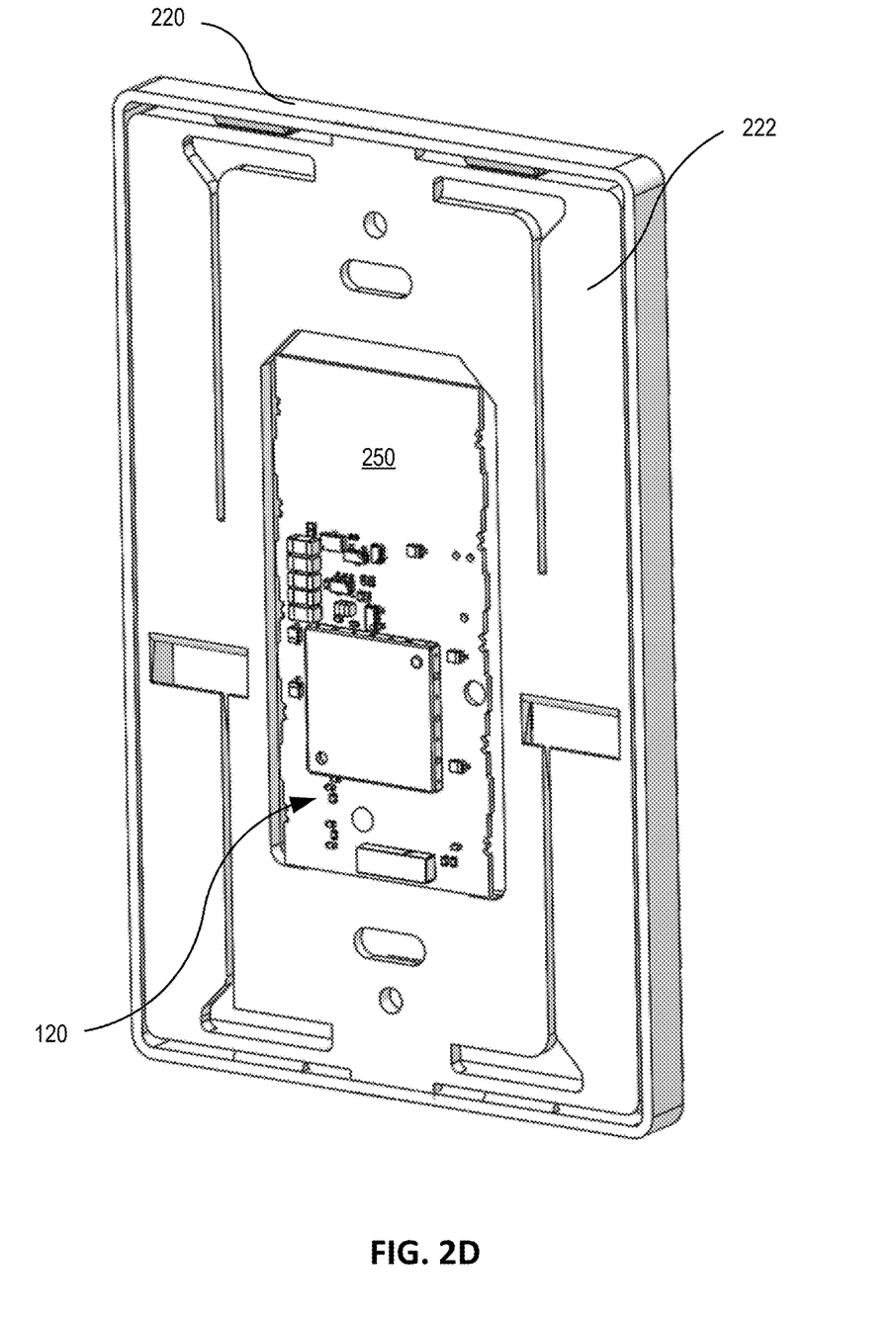
FIG. 2D is a diagram illustrating an example of a wireless charging station mounted on the wall plate of FIG. 2A according to some aspects of the present disclosure.

FIG. 2D is a diagram illustrating an example of a wireless charging station 120 mounted on the wall plate 220 of FIG. 2A according to some aspects of the present disclosure. The inductive charging receiver circuit (e.g., the inductive charging receiver circuit 112) of the wireless charging station 120 may be mounted on a printed circuit board (PCB) 250. The PCB 250 may be retained internally to the wall plate 220 as shown or may be mounted externally to the wall plate 220 on a rear surface 222 of the wall plate 220.

Figure 3A:
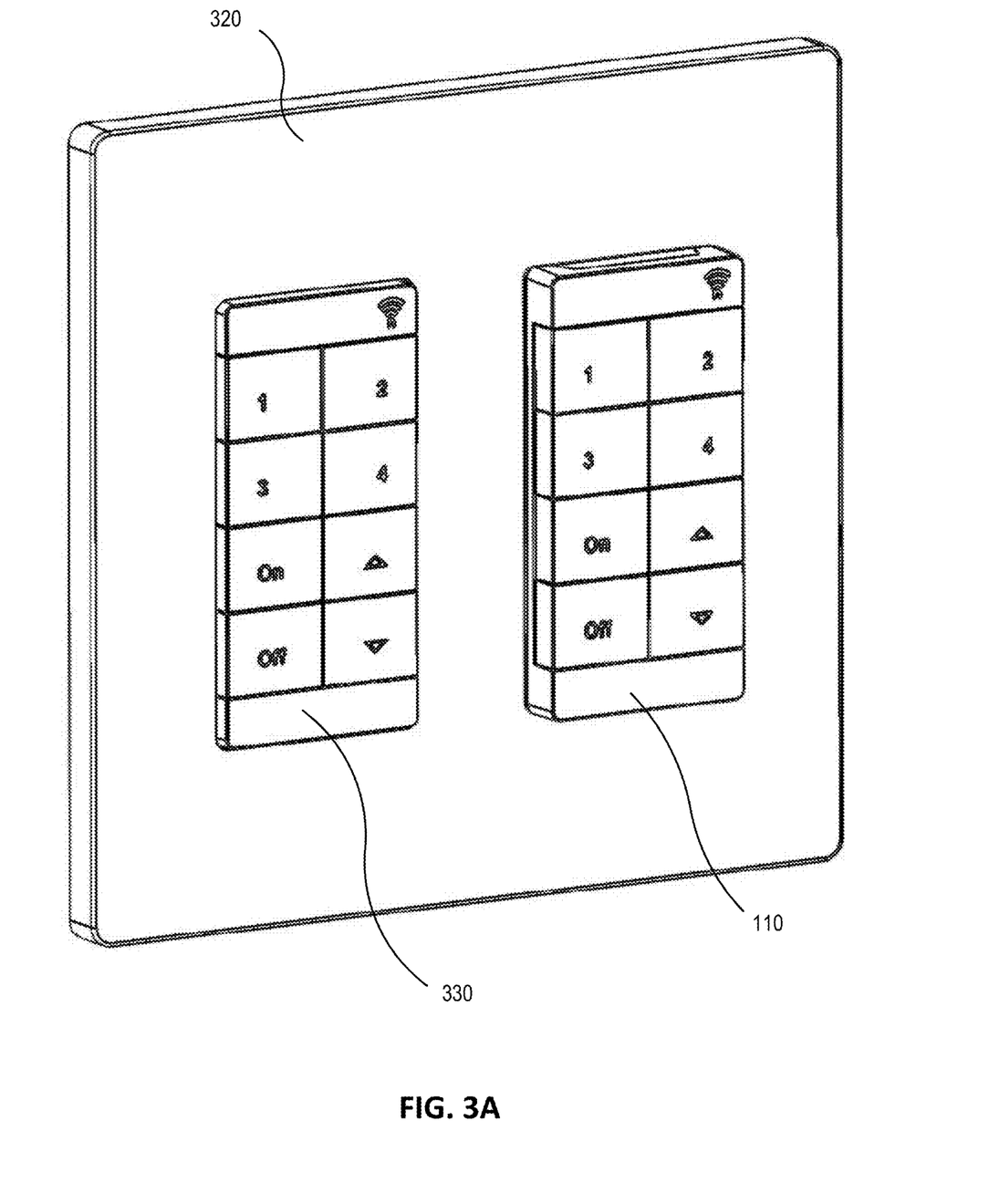
FIG. 3A is a diagram illustrating another example of a wall plate for inductively charging a wireless remote lighting controller according to some aspects of the present disclosure.

FIG. 3A is a diagram illustrating another example of a wall plate 320 for inductively charging a wireless remote lighting controller according to some aspects of the present disclosure. FIG. 3A illustrates a wireless remote lighting controller 110 mounted on the wall plate 320. In some implementations, the wireless charging station 120 may be incorporated into a housing that encloses other components, for example, but not limited to, power regulation components, communication components, etc., of the wall plate 320. In some implementations, the wireless charging station 120 may be attached to an opposite side of the wall plate 320 from the side on which the wireless remote lighting controller 110 mounted. Power for the wireless charging station 120 may be provided by a wired connection to an external power supply (e.g., the external power supply 130) such as USB power, 120 VAC, power, etc.

The wall plate 320 may include a permanently mounted lighting controller 330. The permanently mounted lighting controller 330 may be a wireless lighting controller or a wired lighting controller. The permanently mounted lighting controller 330 may provide the same lighting control functionality for luminaires, for example, on/off, dimming, color settings, activation of preset lighting scenes (e.g., light levels in different preset zones), etc., or it may provide different functionality than the wireless remote lighting controller 110. The permanently mounted lighting controller 330 may have wireless or wired connections to the luminaires. The wireless remote lighting controller 110 may be mounted on the wall plate 320 adjacent to the permanently mounted lighting controller 330.

Figure 3B:
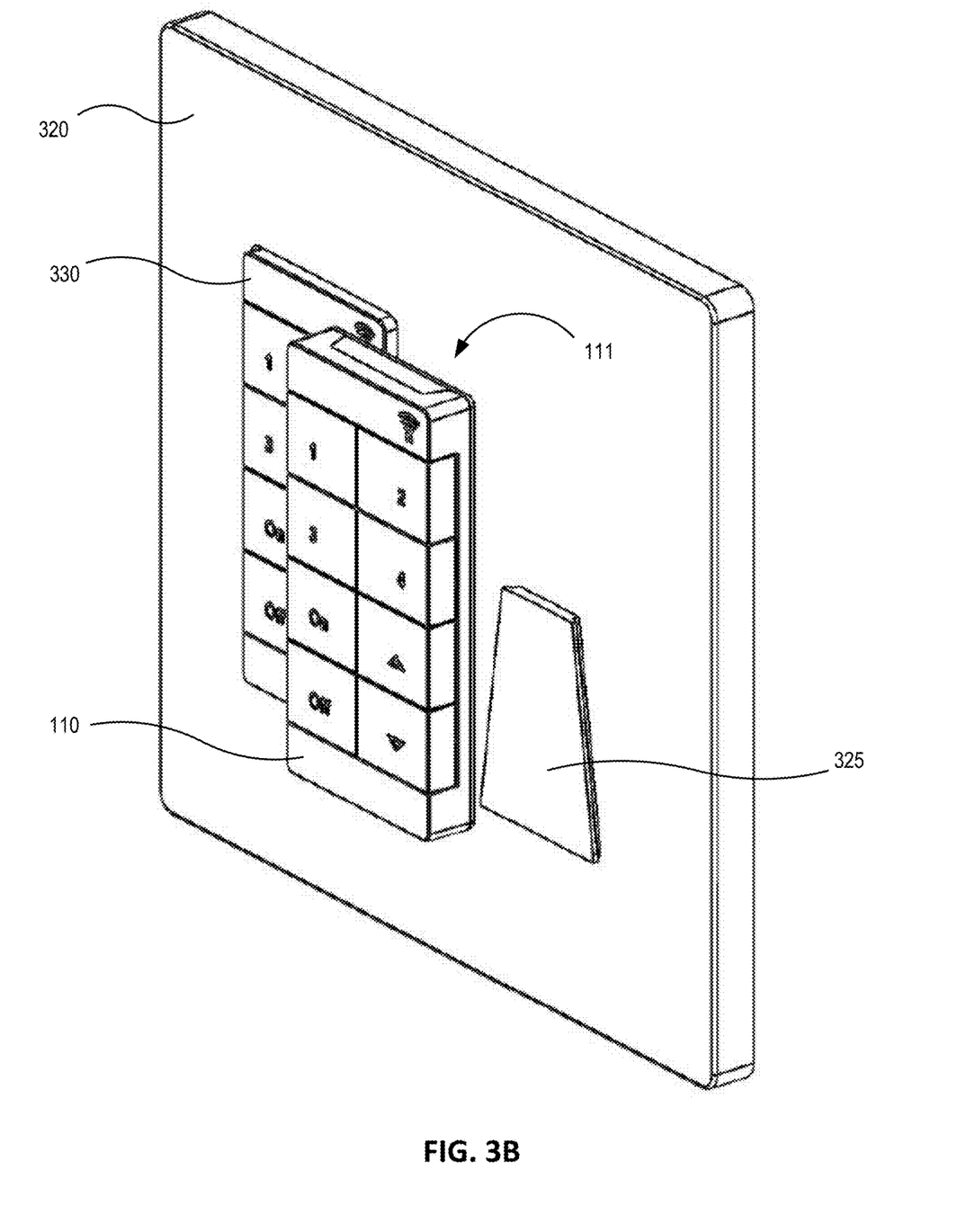
FIG. 3B is a diagram illustrating an example of a mounting mechanism on the wall plate of FIG. 3A according to some aspects of the present disclosure.

Inductive charging of the batteries in the wireless remote lighting controller 110 may occur when the wireless remote lighting controller 110 is mounted on the wall plate 320. The inductive charging may be performed without requiring an electrical connector or other resistance contact between the wireless remote lighting controller 110 and the wall plate 320. The wall plate 320 may include a mounting mechanism configured to retain the wireless remote lighting controller 110 when the wireless remote lighting controller 110 is placed on the wall plate 320. FIG. 3B is a diagram illustrating an example of a mounting mechanism on the wall plate of FIG. 3A according to some aspects of the present disclosure.

As shown in FIG. 3B, the wall plate 320 may include a mounting mechanism 325. The mounting mechanism 325 may be disposed on the wall plate 320 adjacent to the permanently mounted lighting controller 330 and may have a shape configured to retain the wireless remote lighting controller 110 when the wireless remote lighting controller 110 is mounted on the wall plate 320. For example, the mounting mechanism 325 may have a raised trapezoidal shape corresponding to a trapezoidal slot in the back surface 111 of the wireless remote lighting controller 110. Other configurations of the mounting mechanism and corresponding configurations of the back surface of the wireless remote lighting controller may be used without departing from the scope of the present disclosure.

The mounting mechanism 325 may position the inductive charging receiver circuit (e.g., the inductive charging receiver circuit 112) of the wireless remote lighting controller 110 in proximity to the inductive charging transmitter circuit (e.g., the inductive charging transmitter circuit 122) of the wireless charging station (e.g., the wireless charging station 120) when the wireless remote lighting controller 110 is mounted on the wall plate 320. For example, the inductive charging transmitter circuit may be disposed in the wall plate 320 in an area that sits substantially flush against a back surface 111 of the wireless remote lighting controller 110.

Figure 3C:
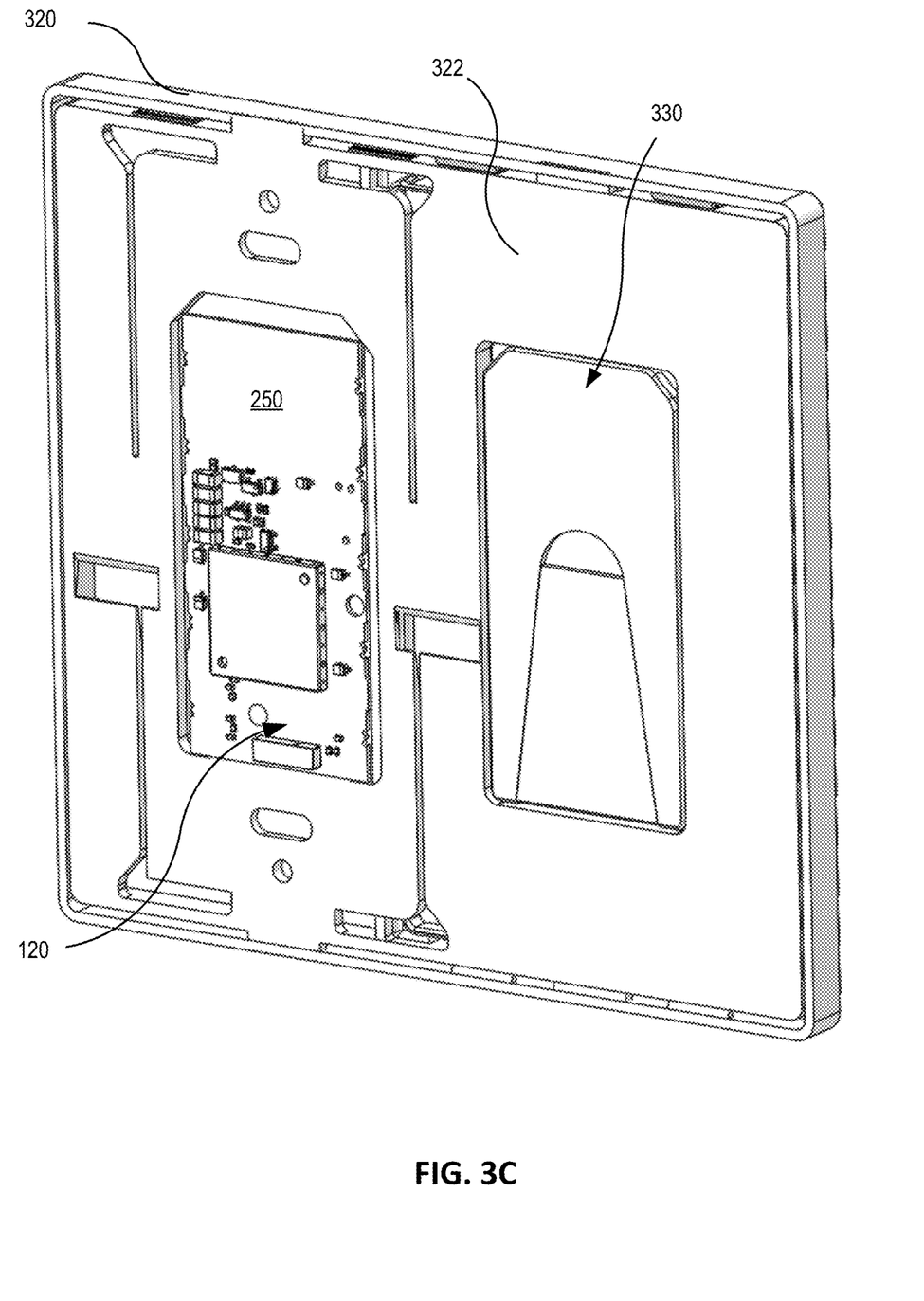
FIG. 3C is a diagram illustrating an example of a wireless charging station a permanently mounted lighting controller mounted on the wall plate of FIG. 3A according to some aspects of the present disclosure.

FIG. 3C is a diagram illustrating an example of a wireless charging station a permanently mounted lighting controller mounted on the wall plate of FIG. 3A according to some aspects of the present disclosure. The inductive charging receiver circuit (e.g., the inductive charging receiver circuit 112) of the wireless charging station 120 may be mounted on a printed circuit board (PCB) 250. The PCB 250 may be retained internally to the wall plate 320 as shown or may be mounted externally to the wall plate 320 on a rear surface 322 of the wall plate 320. The permanently mounted lighting controller 330 may recessed into the wall plate 320 and cannot be removed.

Figure 4A:
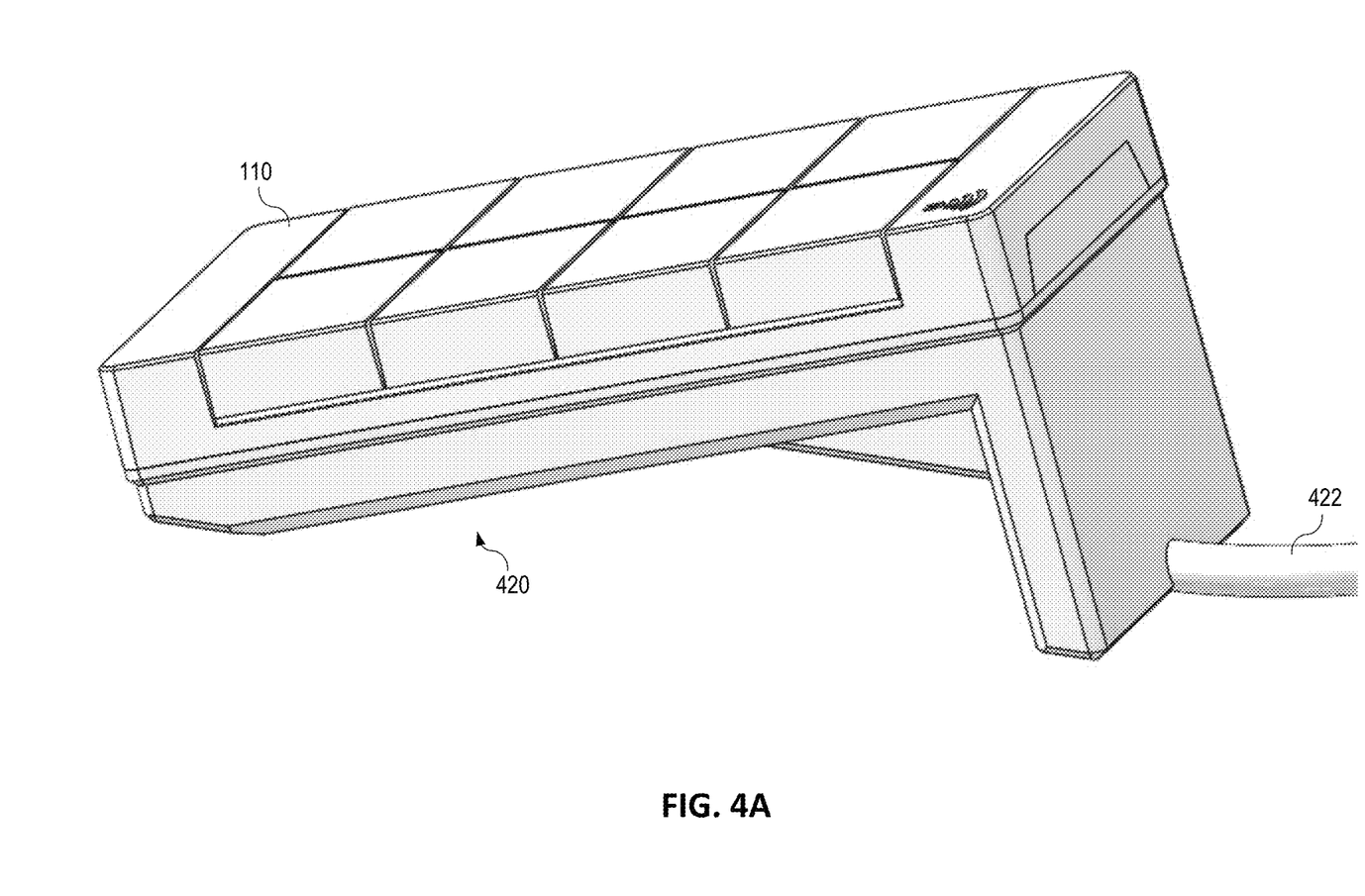
FIG. 4A is a diagram illustrating an example of a desktop cradle for inductively charging a wireless remote lighting controller according to some aspects of the present disclosure.

FIG. 4A is a diagram illustrating an example of a desktop cradle 420 for inductively charging a wireless remote lighting controller according to some aspects of the present disclosure. The desktop cradle 420 may be used together with or instead of the wall plate (e.g., the wall plate 220 or 320) for charging the batteries of the wireless remote lighting controller 110. FIG. 4A illustrates a wireless remote lighting controller 110 mounted on the desktop cradle 420. The wireless charging station 120 may be attached to an opposite side of the desktop cradle 420 from the side on which the wireless remote lighting controller 110 mounted, or the wireless charging station 120 may be incorporated into a housing that encloses other components, for example, but not limited to, power regulation components, communication components, etc., of the desktop cradle 420. Power for the wireless charging station 120 may be provided by a wired connection to an external power supply (e.g., the external power supply 130) such as USB power, 120 VAC power, etc. In some implementations, the wireless charging station 120 may be powered by a power supply, for example, a battery or battery pack, incorporated into the desktop cradle 420.

Figure 4B:
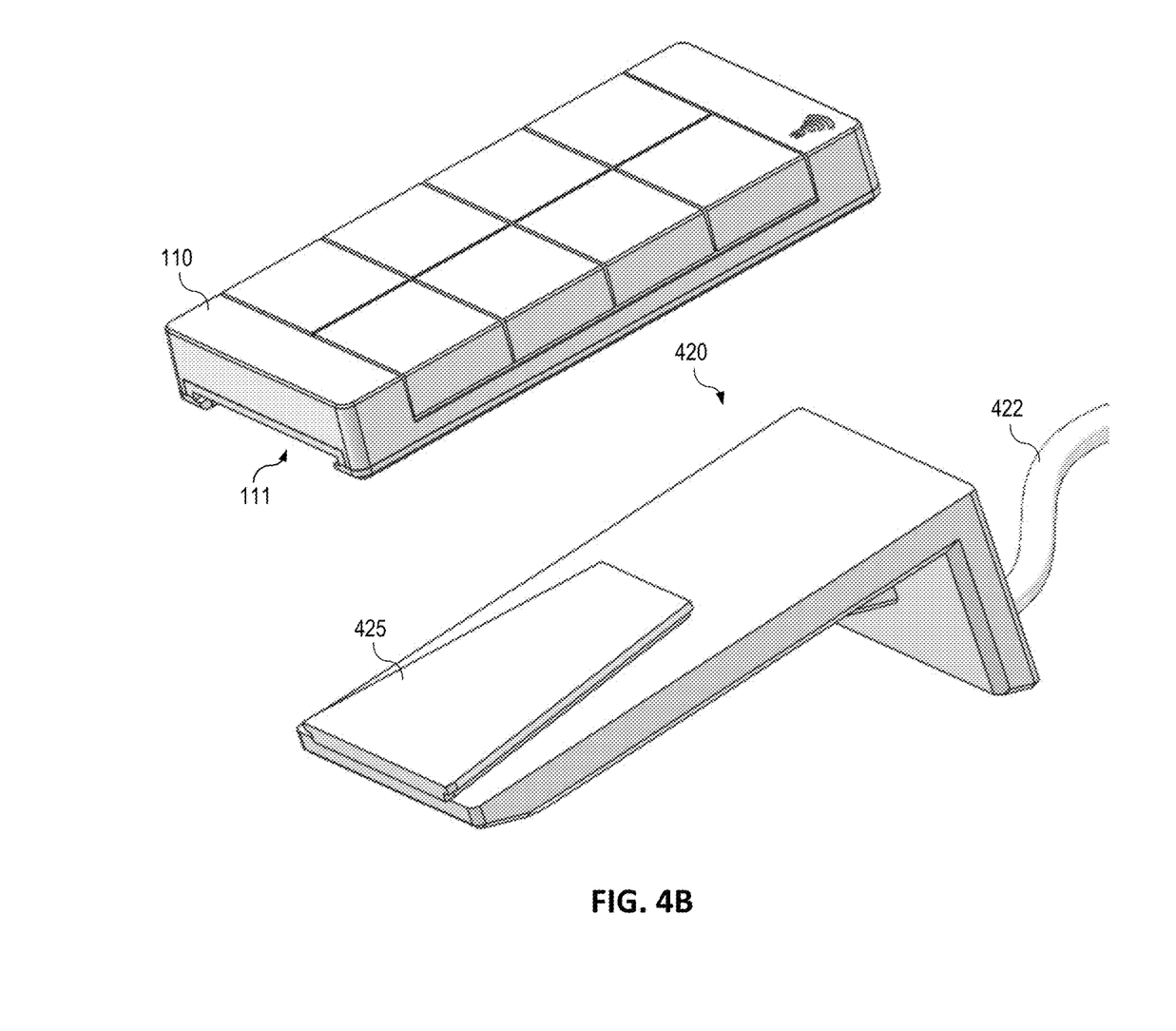
FIG. 4B is a diagram illustrating an example of a mounting mechanism on the desktop cradle of FIG. 4A according to some aspects of the present disclosure.

Inductive charging of the batteries in the wireless remote lighting controller 110 may occur when the wireless remote lighting controller 110 is mounted on the desktop cradle 420. The inductive charging may be performed without requiring an electrical connector or other resistance contact between the wireless remote lighting controller 110 and the desktop cradle 420. The desktop cradle 420 may include a mounting mechanism configured to retain the wireless remote lighting controller 110 when the wireless remote lighting controller 110 is placed on the desktop cradle 420. FIG. 4B is a diagram illustrating an example of a mounting mechanism on the wall plate of FIG. 4A according to some aspects of the present disclosure.

As shown in FIG. 4B, the desktop cradle 420 may include a mounting mechanism 425. The mounting mechanism 425 may have a shape configured to retain the wireless remote lighting controller 110 when the wireless remote lighting controller 110 is mounted on the desktop cradle 420. For example, the mounting mechanism 425 may have a raised trapezoidal shape corresponding to a trapezoidal slot in the back surface 111 of the wireless remote lighting controller 110. Other configurations of the mounting mechanism and corresponding configurations of the back surface of the wireless remote lighting controller may be used without departing from the scope of the present disclosure.

The mounting mechanism 425 may position the inductive charging receiver circuit (e.g., the inductive charging receiver circuit 112) of the wireless remote lighting controller 110 in proximity to the inductive charging transmitter circuit (e.g., the inductive charging transmitter circuit 122) of the wireless charging station (e.g., the wireless charging station 120) when the wireless remote lighting controller 110 is mounted on the desktop cradle 420. For example, the inductive charging transmitter circuit may be disposed in the desktop cradle 420 in an area that sits substantially flush against a back surface 111 of the wireless remote lighting controller 110.

Figure 4C:
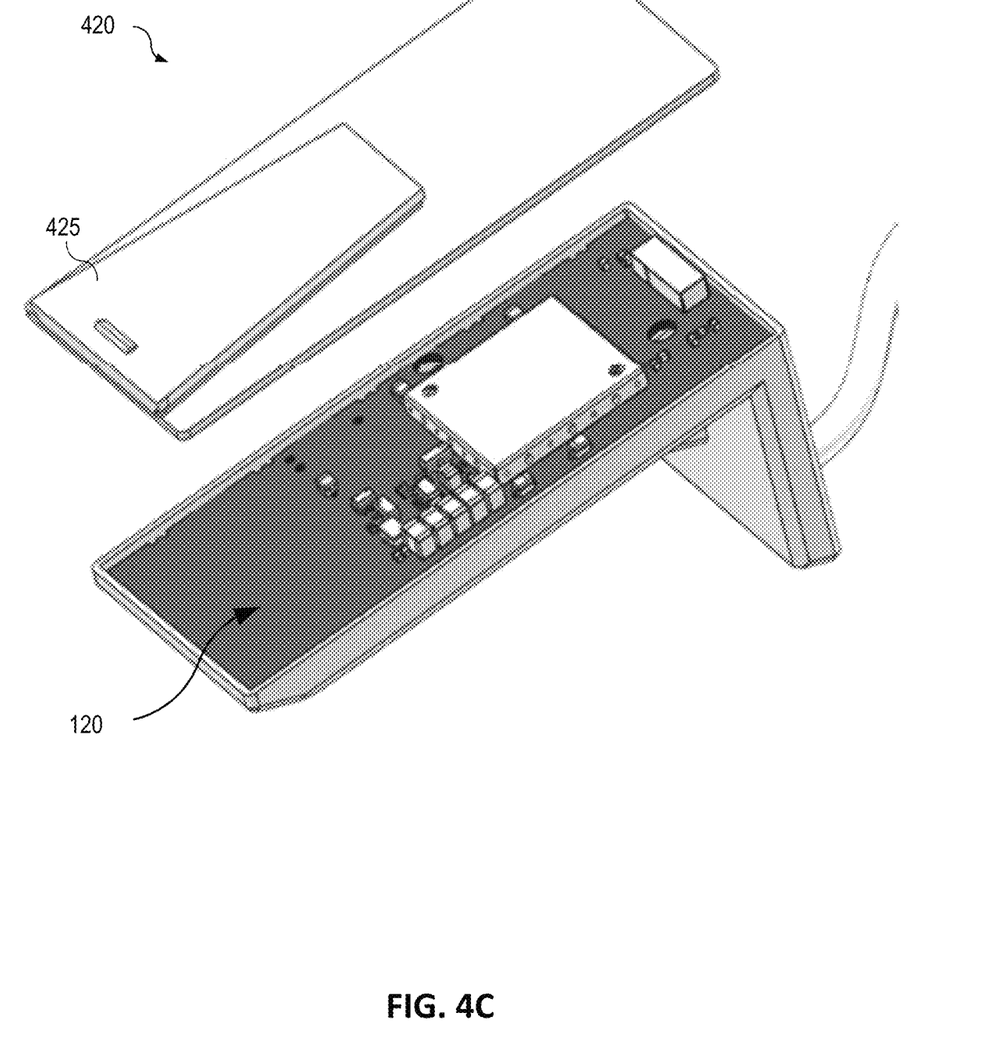
FIG. 4C is a diagram illustrating an example of a wireless charging station mounted on the desktop cradle of FIG. 4A according to some aspects of the present disclosure.

FIG. 4C is a diagram illustrating an example of a wireless charging station 120 mounted on the desktop cradle 420 of FIG. 4A according to some aspects of the present disclosure. The inductive charging receiver circuit (e.g., the inductive charging receiver circuit 112) of the wireless charging station 120 may be mounted on a printed circuit board (PCB) 450. The PCB 450 may be retained internally to the desktop cradle 420.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A wall-mounted wireless battery charger for a wireless remote lighting controller, the wall-mounted wireless battery charger comprising:
   a wall plate configured to removably retain the wireless remote lighting controller;
   an inductive charging transmitter circuit coupled to the wall plate, the inductive charging transmitter circuit being configured to wirelessly interface with an inductive charging receiver circuit of the wireless remote lighting controller when the wireless remote lighting controller is retained by the wall plate; and
   a first processor,
   wherein the first processor is configured to form a wireless data link with a second processor of the wireless remote lighting controller when the wireless remote lighting controller is retained by the wall plate, and
   wherein the inductive charging receiver circuit is configured to wirelessly receive power from the inductive charging transmitter circuit and generate a direct current (DC) voltage to charge a battery of the wireless remote lighting controller.

2. The wall-mounted wireless battery charger of claim 1, wherein the inductive charging transmitter circuit receives power from an external power supply.

3. The wall-mounted wireless battery charger of claim 1, further comprising a mounting mechanism configured to removably retain the wireless remote lighting controller to the wall plate.

4. The wall-mounted wireless battery charger of claim 3, wherein the mounting mechanism is configured to position the inductive charging receiver circuit of the wireless remote lighting controller in proximity to the inductive charging transmitter circuit.

5. The wall-mounted wireless battery charger of claim 1, further comprising a permanently mounted lighting controller.

6. The wall-mounted wireless battery charger of claim 5, further comprising a mounting mechanism configured to removably retain the wireless remote lighting controller to the wall plate,
   wherein the mounting mechanism is disposed adjacent to the permanently mounted lighting controller.

7. The wall-mounted wireless battery charger of claim 6, wherein the mounting mechanism is configured to position the inductive charging receiver circuit of the wireless remote lighting controller in proximity to the inductive charging transmitter circuit.

8. The wall-mounted wireless battery charger of claim 1, wherein data transmitted via the wireless data link comprises diagnostic data cached by the wireless remote lighting controller.

9. A wall plate, comprising:
   a mounting mechanism configured to removably retain a wireless remote lighting controller;
   an inductive charging transmitter circuit configured to wirelessly interface with an inductive charging receiver circuit of the wireless remote lighting controller when the wireless remote lighting controller is retained by the mounting mechanism; and
   a first processor,
   wherein the first processor is configured to form a wireless data link with a second processor of the wireless remote lighting controller when the wireless remote lighting controller is retained by the mounting mechanism, and wherein the inductive charging receiver circuit is configured to wirelessly receive power from the inductive charging transmitter circuit and generate a direct current (DC) voltage to charge a battery of the wireless remote lighting controller.

10. The wall plate of claim 9, wherein the inductive charging transmitter circuit receives power from an external power supply.

11. The wall plate of claim 9, wherein the mounting mechanism is configured to position the inductive charging receiver circuit of the wireless remote lighting controller in proximity to the inductive charging transmitter circuit.

12. The wall plate of claim 9, further comprising a permanently mounted lighting controller.

13. The wall plate of claim 12, wherein the mounting mechanism is configured to position the inductive charging receiver circuit of the wireless remote lighting controller in proximity to the inductive charging transmitter circuit.

14. A desktop cradle for inductively charging a wireless remote lighting controller, the desktop cradle comprising:

a mounting mechanism configured to removably retain the wireless remote lighting controller;

an inductive charging transmitter circuit configured to wirelessly interface with an inductive charging receiver circuit of the wireless remote lighting controller when the wireless remote lighting controller is retained by the mounting mechanism; and a first processor, wherein the first processor is configured to form a wireless data link with a second processor of the wireless remote lighting controller when the wireless remote lighting controller is retained by the mounting mechanism, and wherein the inductive charging receiver circuit is configured to wirelessly receive power from the inductive charging transmitter circuit and generate a direct current (DC) voltage to charge a battery of the wireless remote lighting controller.

15. The desktop cradle of claim 14, wherein the inductive charging transmitter circuit receives power from an external power supply.

16. The desktop cradle of claim 14, wherein the mounting mechanism is configured to position the inductive charging receiver circuit of the wireless remote lighting controller in proximity to the inductive charging transmitter circuit.

17. The desktop cradle of claim 14, wherein data transmitted via the wireless data link comprises diagnostic data cached by the wireless remote lighting controller.

* * * * *